(12) United States Patent
Hasegawa

(10) Patent No.: US 6,192,221 B1
(45) Date of Patent: *Feb. 20, 2001

(54) TELEPHONE WITH ANGLED BOOM MIKE

(75) Inventor: Yutaka Hasegawa, San Francisco, CA (US)

(73) Assignees: Sony Corporation of Japan, Tokyo (JP); Sony Electronics, Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/975,946

(22) Filed: Nov. 21, 1997

(51) Int. Cl.$^7$ ............................................ H04M 1/00
(52) U.S. Cl. ........................ 455/90; 455/575; 379/433; 379/428
(58) Field of Search ........................ 455/90, 89, 348, 455/403, 525; 379/428, 433, 403, 368, 369, 434, 201

(56) References Cited

U.S. PATENT DOCUMENTS

| | | | |
|---|---|---|---|
| D. 350,744 | 9/1994 | Hino | D14/138 |
| 5,197,091 | * 3/1993 | Takagi et al. | 379/58 |
| 5,504,813 | 4/1996 | Takasaki | 379/433 |
| 5,715,311 | * 2/1998 | Sudo et al. | 379/428 |
| 5,734,707 | * 3/1998 | El-Wailly | 379/167 |

* cited by examiner

*Primary Examiner*—Daniel S. Hunter
*Assistant Examiner*—Pablo Tran
(74) *Attorney, Agent, or Firm*—Wagner, Murabito & Hao LLP

(57) ABSTRACT

A telephone including a boom which is pivotally connected to the telephone body. The boom is connected to the telephone body such that it may be pivoted from a retracted position to an extended position. In the retracted position, the telephone has a small size such that the telephone may be placed in a user's pocket. In one embodiment, the sides of the telephone body are tapered from the top of the telephone to the bottom of the telephone. A microphone is located near one end of the boom. The boom is aligned such that, when the boom is moved into the extended position, the boom angles inward such that the microphone is located near the center line of the telephone. This allows a user to more easily speak into the microphone and allows for both right and left handed users to easily use the telephone.

10 Claims, 2 Drawing Sheets

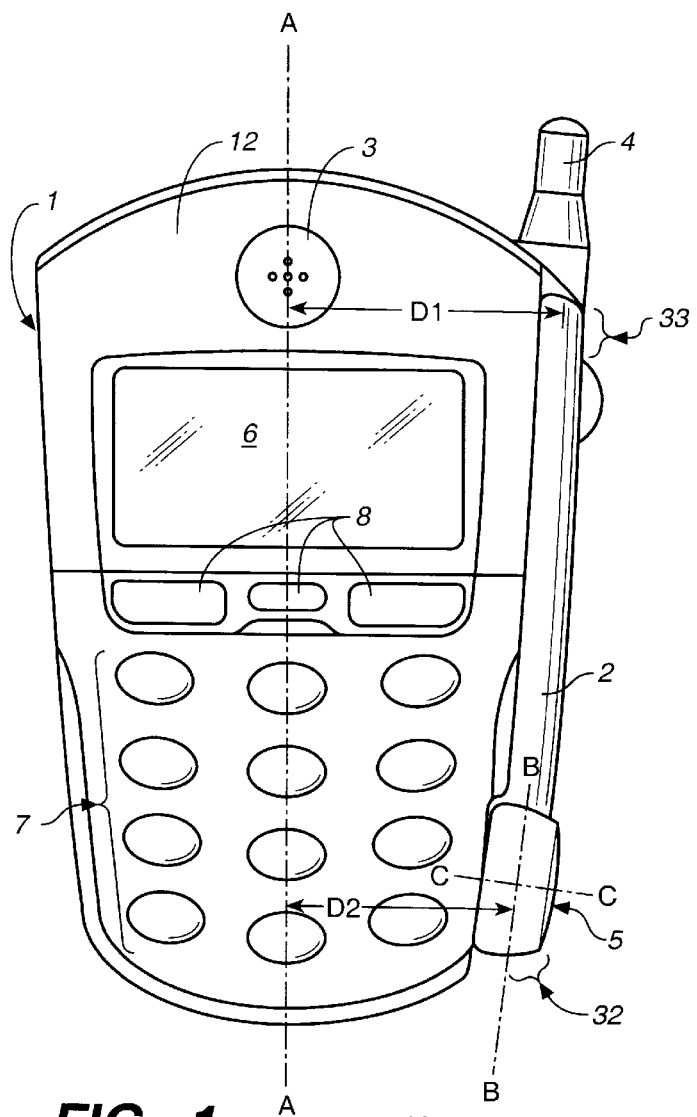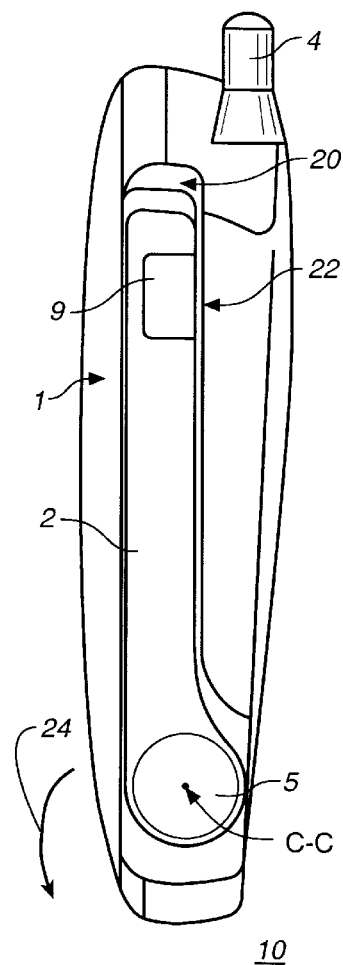
FIG._1
FIG._2

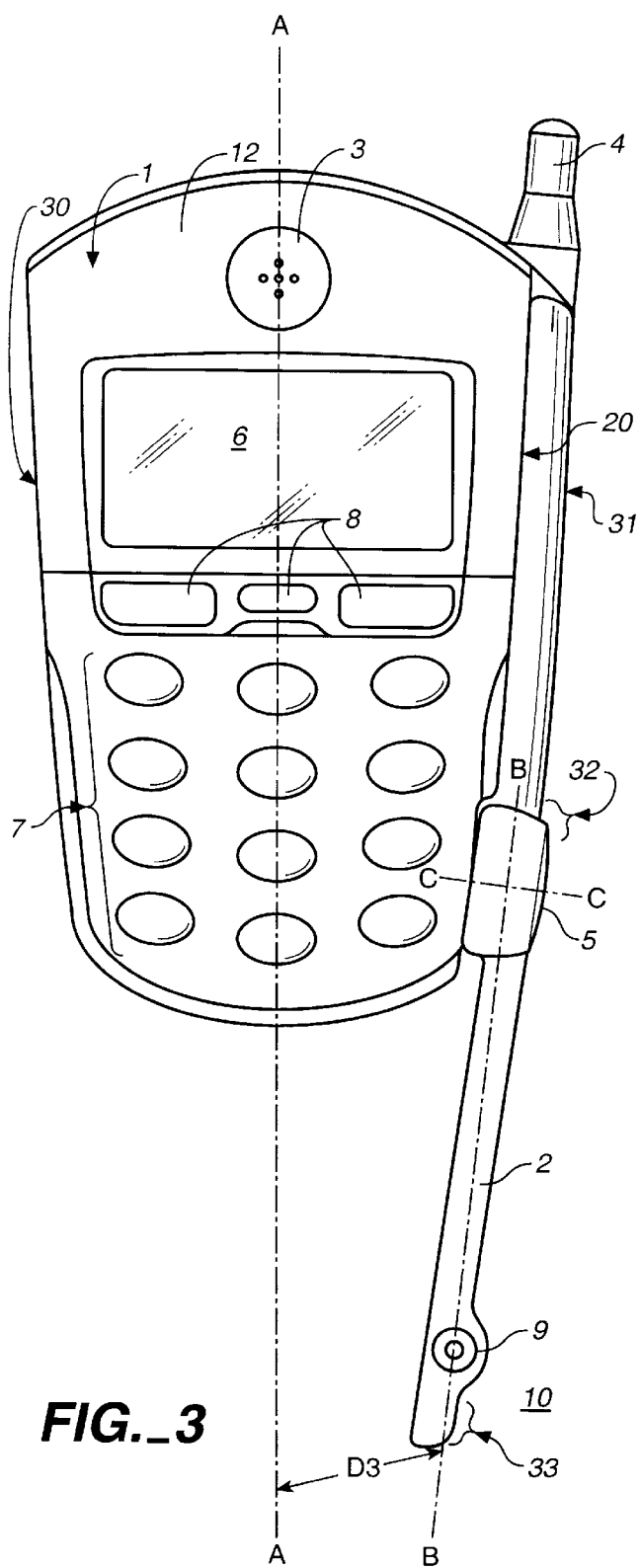
FIG._3
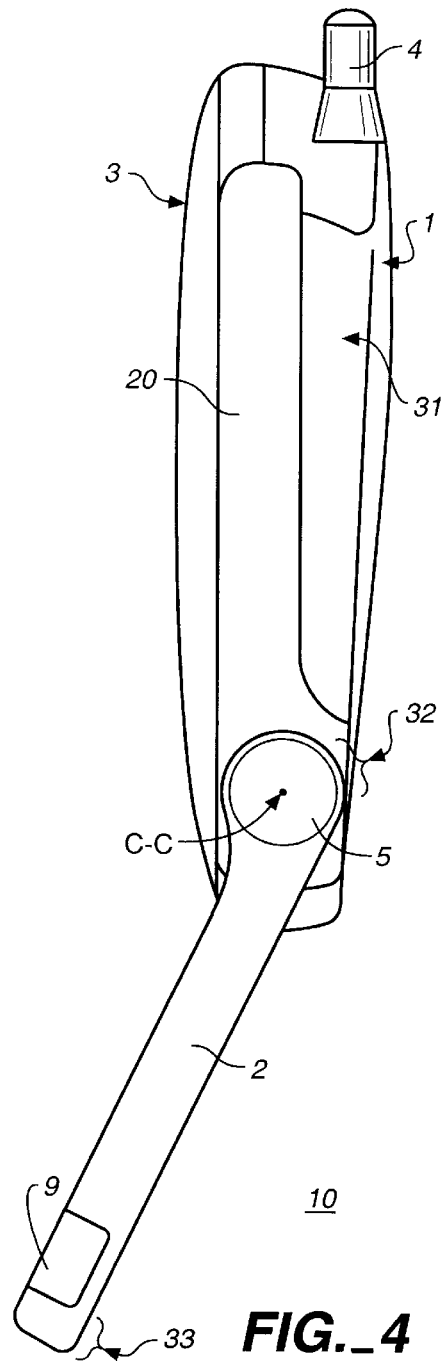
FIG._4

TELEPHONE WITH ANGLED BOOM MIKE

TECHNICAL FIELD

This invention relates to the field of communication devices. More specifically, the present invention relates to an improved telephone.

BACKGROUND ART

Early cellular telephones included large housings which contained large and heavy batteries and extensive electronic circuitry. As cellular telephones developed over the years, their size has steadily decreased. This has been partly due to the integration of the electronic functions into semiconductor devices such as digital signal processors specifically designed to process the electrical operations of a cellular telephone. In addition, smaller, more powerful batteries have been developed.

In fact, this progression to smaller and smaller cellular telephones now is limited by form and function requirements. That is, because a user must speak into a microphone and listen to sounds from a speaker, prior art cellular telephones are generally at least large enough to extend from a user's ear to near the user's mouth. More specifically, conventional cellular telephones have height of approximately 6 to 10 inches so as to span the distance between a typical user's ear and the user's mouth.

Though cellular telephones have become smaller and smaller, the typical cellular telephone is still larger than a user's pocket. This requires a user to either carry the cellular telephone in a bag or briefcase, or carry the cellular telephone in his hand. Some cellular telephones include clips so that the cellular telephone may be clipped to a user's belt or pocket. However, these methods of carrying a cellular telephone are not as convenient as carrying the cellular telephone in the user's pocket. Thus, cellular telephone manufacturers have attempted to make cellular telephones which will fit into a user's pocket.

One of the limiting factors in making cellular telephones smaller is a requirement on the size of the keypad. More specifically, the cellular telephone must have a keypad which is of a sufficient size for a user to easily input alphanumeric data into the telephone. Another limiting factor in making cellular telephones smaller is a requirement on the size of the cellular telephone display. A cellular telephone must generally have a display of a sufficient size so as to allow a user to easily see displayed data.

Recently, cellular telephone manufacturers have developed designs which fit within a users pocket. One pocket-sized conventional cellular telephone is a two piece design. The two-piece conventional cellular telephone is comprised of a main body and a plate which is pivotally connected to the main body. The plate is adapted to extend from the main body so as to channel sound to a microphone located near the bottom of the main body. Due to the need for a full sized keyboard and display, the plate is typically made of thin plastic which partially covers the keyboard and/or the display when the plate is in a retracted position. Such a conventional cellular telephone is prone to damage when the plate is extended away from the main body. In addition, since sound is channeled to the speaker, the sound received by the speaker is often of poor quality, particularly when the user does not speak directly into the plate.

Another prior art cellular telephone design employs a speaker located near the top of the telephone in conjunction with a downwardly extending boom. The boom has a microphone disposed near the end thereof. In order of the cellular telephone to fit into a pocket, and also comply with the size requirements for a keypad and a display, conventional cellular telephone designs locate the boom on one side of the cellular telephone.

When a user places the speaker near one ear, the boom extends down far enough such that microphone is at the same level as the user's mouth. In a conventional cellular telephone, the boom extends vertically from the right side of the telephone such that the end of the boom is close to the user's mouth. As a result, conventional cellular telephones function relatively well when a user is right-handed. However, such a conventional cellular telephone design is unacceptable for both right-handed and left-handed use. Furthermore, most users are accustomed to placing the speaker quite close to their mouth. Thus, the user often must twist and/or turn the telephone to manipulate the microphone closer to his mouth. When the user is left-handed, or in any situation where a user desires to place the telephone against his left ear, the distance between the user's mouth and the end of the boom is too great. In addition to compromising the performance of the cellular telephone, such manipulation is uncomfortable for many users.

What is needed is a cellular telephone which is small enough to fit into a user's pocket and which may be operated comfortably by both right-handed users and left-handed users. In particular, a cellular telephone design which includes an adequately sized display and an adequately sized keypad and which will fit into a user's pocket is needed. The present invention meets the above needs.

DISCLOSURE OF THE INVENTION

The present invention provides a telephone which is small enough to fit into a user's pocket and which may be comfortably operated by both right-handed users and left-handed users.

A telephone is disclosed which includes a telephone body and a boom. In one embodiment, the boom is connected to the telephone body by a pivot joint which allows the boom to pivot from a retracted position into an extended position. In the retracted position, the boom fits against the telephone body such that a compact profile is obtained. The telephone is small enough to be placed into a user's pocket when the boom is in the retracted position. This is due, in part, to the reduced height of the telephone which is made possible by the retracting boom.

The telephone of the present embodiment also includes an antenna, a speaker, a display, function keys, and a keypad. The speaker is located on the front side of the telephone body as are the display, the function keys, and the keypad. The speaker is located near the top of the telephone body.

In the present embodiment, the right side of the telephone and the left side of the telephone taper inward from the top of the telephone to the bottom of the telephone. This provides side surfaces which are at an angle relative to the center line of the telephone. In the retracted position, the boom is attached to the side of the telephone and it extends alongside the side of the telephone. More specifically, the boom fits within a ledge formed in the side of the telephone. The ledge conforms to the shape of the side of the telephone. Thus, the boom is also at an angle relative to the center line of the telephone.

The boom of the present embodiment extends by pivoting downward. Because the boom is at an angle relative to the center line of the telephone, the movement of the boom downward also moves the boom inward. As a result, downward movement of the boom places the extended end of the boom closer to the center line of the telephone. A microphone is attached to the boom near the end thereof. In the present embodiment, when the boom is fully extended, the telephone is long enough such that, when a user places the speaker near one ear, the microphone is near the user's mouth. Because the microphone is near to the user's mouth, the present embodiment achieves good sound quality. This makes the present telephone easier to use and more comfortable than prior art telephones. In the present embodiment, the user does not have to twist and turn the telephone to manipulate the microphone close to his mouth. In addition, because the speaker is close to the center line of the telephone, when in the extended position, the telephone may be comfortably used against either the right side or the left side of a user's face. Hence, the telephone of the present invention is well suited for use by both right-handed users and left-handed users.

In another embodiment of the present invention, the telephone is a cellular telephone. As in the previous embodiment, the cellular telephone includes electronic circuitry disposed within the telephone body to allow a user to operate the telephone and communicate with others via a cellular telephone network. Alternatively, the telephone of the present invention could be used to communicate via a satellite communication network, or other types of communication networks and facilities.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a front view of a telephone having a boom in the retracted position in accordance with the present invention.

FIG. 2 is a side view of a telephone having a boom in the retracted position in accordance with the present invention.

FIG. 3 is a front view of a telephone having a boom in the extended position in accordance with the present invention.

FIG. 4 is a side view of a telephone having a boom in the extended position in accordance with the present invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

FIG. 1 shows telephone 10 which includes telephone body 1 and boom 2. In one embodiment, both telephone body 1 and boom 2 are made of plastic. Boom 2 extends along one side of telephone body 1. Boom 2 is attached to telephone body 1 via pivot joint 5. Pivot joint 5 allows boom to pivot about axis C—C such that boom 2 may be extended and retracted. Boom 2 is long and narrow and extends longitudinally along longitudinal axis B—B. The length of boom 2 is only slightly less than the height of telephone body 1. Boom 2 fits against telephone body 1 such that, when boom 2 is in the retracted position, telephone 10 has a compact profile.

FIG. 1 further illustrates a center line A—A drawn through the center of telephone 10. Center line A—A is a reference line drawn to show the center of telephone 10. Longitudinal axis B—B is shown to be at an angle with respect to center line A—A. Boom 2 includes attached end 32 and extendible end 33. Extendible end 33 is at a distance D1 from center line A—A, and attached end 32 is at a distance D2 from center line A—A. Distance D1 is greater than distance D2. Thus, when retracted, extendible end 33 of boom 2 is farther from center line A—A than is attached end 32 of boom 2.

Telephone 10 of FIG. 1 also includes keypad 7 which is disposed within telephone body 1 such that keys extending from telephone body 1 are operable by a user. In one embodiment, keypad 7 is a standard 12-key alphanumeric keypad. Telephone 10 includes electronic circuitry (not shown) which is contained within telephone body 1 and which electrically connects to keypad 7. This allows a user to input data into telephone 10 by operating keypad 7. Telephone 10 also includes a battery (not shown) which is electrically coupled to the electronic circuitry for providing power to telephone 10. In one embodiment, telephone 10 is programmable such that frequently used telephone numbers may be stored electronically within the electronic circuitry of telephone 10 by operating the alphanumeric keys of keypad 7.

Continuing with FIG. 1, telephone 10 is also shown to include antenna 4 which is coupled to the electronic circuitry of telephone 10. Antenna 4 receives and transmits radio signals. This provides for communication between telephone 10 and a cellular transmission and reception facility.

Display 6 is shown to be disposed within telephone body 1 such that display 6 may be easily seen by a user. Display 6 is electrically coupled to the electronic circuitry of telephone 10 such that data may be displayed thereon and viewed by a user. In one embodiment display 6 is operable in response to the operation of the keys of keypad 7 such that names and telephone numbers may be programmed into telephone 10 and such that telephone numbers entered by operating keypad 7 are displayed on display 6.

Telephone 10 of FIG. 1 also includes function keys 8. Function keys 8 are connected to the electronic circuitry of telephone 10. In one embodiment, function keys 8 include a send key which is operable by a user to initiate a cellular connection using telephone 10. In one embodiment, function keys 8 also include an end key which is operable by a user to end transmission and disconnect a cellular connection.

Continuing with FIG. 1, telephone 10 also includes speaker 3 which is attached to telephone body 1. Speaker 3 is electrically connected to the electronic circuitry of telephone 10 such that sound is projected from speaker 3 during the operation of telephone 10. Telephone body 1 includes a front surface 12. In the embodiment shown in FIG. 1, speaker 3, display 6, keypad 7, and function keys 8 are attached to telephone body 1 such that they are disposed within front surface 12.

FIG. 2 shows a side view of telephone 10. In this embodiment, telephone body 1 includes receiving surface 22 which receives boom 2 so as to limit the pivotal movement of boom 2. In one embodiment, receiving surface 22 is closely toleranced to the shape of boom 2 such that boom 2 fits against receiving surface 22 when boom 2 is in the retracted position. Since boom 2 fits close to side surface 20 and against receiving surface 22 in the retracted position, the present invention achieves a solid unit which easily fits within a user's pocket. The close fit of boom 2 against side surface 20 and against receiving surface 22 prevents damage to boom 2. In particular, in the retracted position, boom 2 does not project from telephone body 1 in such a way that it would catch on pockets, carrying cases, etc. Rather, it fits within a ledge formed by side surface 20 and receiving surface 22.

FIG. 3 shows telephone 10 of FIGS. 1–2 when boom 2 is rotated into the extended position. Movement of boom 2 from the retracted position into the extended position is accomplished by pivoting boom 2 about axis C—C of FIGS. 1–3 as shown by arrow 24 of FIG. 2. In the extended position, boom 2 exposes microphone 9 disposed at the end thereof. Microphone 9 is electrically coupled to the electronic circuits of telephone 10 via boom 2 and pivot joint 5. Microphone 9 is at a great enough distance from speaker 3 so as to allow a user to place telephone 10 up to the side of his face and have microphone 9 disposed near the user's mouth while speaker 3 is located near the user's ear. Hence, the present invention allows a user to comfortable use telephone 10 without requiring laborious manipulation of telephone 10.

Continuing with FIG. 3, telephone body 1 is shown to have a two side surfaces, left side surface 30 and right side surface 31. Right side surface 31 is shown to include side surface 20 which is inset from the rest of right side surface 31 so as to receive boom 2. Telephone 10 is shown to have center line A—A which runs vertically through the center of telephone 10. Side surface 3 and side surface 31 are disposed at an angle from center line A—A such that telephone 10 has approximately a V-shape. The angles at which side surfaces 30–31 are disposed make telephone body 1 wider at the top than at the bottom and which tapers inward from the top thereof to the bottom thereof. This angular shape causes extendible end 33 of boom 2 to angle towards center line A—A as boom 2 is moved from the retracted position into the extended position.

Because speaker 3 of FIG. 3 is located such that center line A—A runs through it, the movement of extended end 33 of boom 2 near the center line A—A more closely aligns microphone 9 with center line A—A. More specifically, since boom 2 is disposed at an angle relative to center line A—A, extendible end 33 is at a horizontal distance D3 from center line A—A. D3 is significantly smaller than D1 of FIG. 1. D3 is sufficiently small such that microphone 9 is almost directly aligned horizontally with speaker 3. This alignment achieves a telephone which is easier to use. In particular, the proximity of microphone 9 to center line A—A allows a user to speak more directly into microphone 9. Alternatively, the angle of boom 2 relative to center line A—A could be sufficiently great so as to directly align microphone 9 with center line A—A (i.e. D3 would be 0).

With reference to FIG. 4, it can be seen that when boom 2 is in the extended position, extended end 33 of boom 2 extends microphone 9 a vertical distance from speaker 3. The vertical distance between speaker 3 and microphone 9 is sufficient so as to allow a user to place speaker 3 against one ear and microphone 9 near the user's mouth. This gives good quality sound since the user is speaking directly into the microphone. Hence the present invention eliminates much of the compromised sound quality associated with prior art telephones.

Telephone 10 of FIGS. 1–4 is useable on both the right side of a user's face and on the left side of a user's face because, in the extended position, microphone 9 is close to center line A—A. Thus, both right-handed and left-handed users may easily operate telephone 10. In addition, the placement of boom 2 on one side of telephone 10 of FIGS. 1–4 leaves plenty of room for keypad 7, function keys 8, display 6, and speaker 3 to be located on front surface 12.

The telephone of the present invention is well suited for use in satellite communication networks and other types of communication networks. The angled boom mike of the present invention may be implemented in various different telephone body designs. In one embodiment, the sides of the telephone do not taper inward. Instead, the sides are parallel to the center line of the telephone such that the telephone has a rectangular shape when the boom is in the retracted position. In this embodiment the boom fits within a channel or a cavity in the telephone body such that the boom is at an angle relative to the center line of the telephone. This embodiment has all of the advantages of the embodiment disclosed in FIGS. 1–4, but does not have tapering sides.

The boom of FIGS. 1–4 is shown to be straight. However, alternatively, a curved shape may also be used. By using a curved shape which curves inward when the boom is in the extended position, closer alignment between the boom and the center axis may be obtained without increasing the angle at which the boom is disposed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications as are suited to the particular use contemplated. It is intended that the scope of the invention be defined by the Claims appended hereto and their equivalents.

What is claimed is:

1. A compact boom-equipped telephone comprising:
    a telephone body having a front surface and a center line that extends longitudinally through said front surface, said telephone body having a ledge formed within a side surface of said telephone body, said ledge having a side surface that is disposed at an angle relative to said center line; and
    a boom having a first end pivotally coupled to said telephone body, said boom further having a second end adapted to be extended from said telephone body, said boom aligned with said side surface of said ledge such that said boom pivots about an axis that is parallel to said side surface of said ledge and that is not parallel to said centerline such that said second end of said boom is located proximate said center line when said boom is extended from said telephone body.

2. The compact boom-equipped telephone of claim 1 wherein said boom further comprises:

a microphone integral with said second end of said boom.

3. The compact boom-equipped telephone of claim 2 wherein said telephone body further comprises:

a telephone speaker unit.

4. The compact boom-equipped telephone of claim 3 wherein said boom has a length such that when said boom is extended from said telephone body, said microphone is separated from said telephone speaker unit by a distance approximately equal to the distance between an average user's ear and said average user's mouth.

5. The compact boom-equipped telephone of claim 4 wherein said boom is curved.

6. The compact boom-equipped telephone of claim 5 wherein said telephone body further comprises:

a keypad.

7. The compact boom-equipped telephone of claim 6 wherein said telephone body further comprises:

a display.

8. A compact boom-equipped telephone comprising:

a telephone body having a front surface and a center line that extends longitudinally through said front surface, said telephone body having a ledge formed within a side surface of said telephone body, said ledge having a side surface that is disposed at an angle relative to said center line; and means for centrally locating a microphone with respect to a telephone body, said means including a pivotally extending boom having a first end and a second end, said second end having a microphone disposed therein, said first end of said boom pivotally coupled to said telephone body, said boom aligned with said side surface of said ledge such that said boom pivots about an axis that is parallel to said side surface of said ledge and that is not parallel to said centerline such that said microphone is located proximate said center line when said boom is extended from said telephone body.

9. A method for centrally locating one end of a boom with respect to a telephone comprising the steps of:

a) attaching a first end of a boom to a telephone body having a front surface and having and a center line that extends longitudinally through said front surface, said telephone body including a ledge formed within a side surface of said telephone body, said ledge having a side surface that is disposed at an angle relative to said center line, said boom aligned with said side surface of said ledge such that said boom pivots about an axis that is parallel to said side surface of said ledge and that is not parallel to said centerline; and b) pivoting said boom so as to extend a second end of said boom from said telephone body such that said second end of said boom is located proximate said center line.

10. The method for centrally locating one end of a boom with respect to a telephone as recited in claim 9 wherein step a) further comprises:

attaching said first end of said boom having microphone integral therewith to said telephone body.

* * * * *